United States Patent [19]

Petrovich et al.

[11] 4,147,586

[45] * Apr. 3, 1979

[54] CELLULOSIC PAPER CONTAINING THE REACTION PRODUCT OF A DIHALOALKANE ALKYLENE DIAMINE ADDUCT AND EPIHALOHYDRIN

[75] Inventors: John P. Petrovich, Chesterfield; David L. Taylor, St. Louis, both of Mo.

[73] Assignee: Monsanto Company, St. Louis, Mo.

[ * ] Notice: The portion of the term of this patent subsequent to Dec. 17, 1991, has been disclaimed.

[21] Appl. No.: 868,103

[22] Filed: Jan. 9, 1978

Related U.S. Application Data

[63] Continuation-in-part of Ser. No. 506,678, Sep. 14, 1974, abandoned, which is a continuation of Ser. No. 318,819, Dec. 27, 1972, abandoned.

[51] Int. Cl.² .................................................. D21H 3/42
[52] U.S. Cl. ........................................ 162/135; 162/136; 162/164 EP; 427/391; 428/537

[58] Field of Search ............. 162/164 EP, 164 R, 166, 162/158, 184, 168 N, 135, 136; 260/2 BP, 29.2 EP; 427/390, 391; 428/537

[56] References Cited

U.S. PATENT DOCUMENTS

| 2,595,935 | 5/1952 | Daniel et al. | 162/164 EP |
|---|---|---|---|
| 2,834,675 | 5/1958 | Jen et al. | 162/164 R |
| 3,391,090 | 7/1968 | Shiegg | 260/2 |
| 3,855,158 | 12/1974 | Petrovich et al. | 162/164 EP |
| 3,899,388 | 8/1975 | Petrovich et al. | 162/164 EP |

FOREIGN PATENT DOCUMENTS

776566  1/1968  Canada ............................. 162/164 EP

*Primary Examiner*—S. Leon Bashore
*Assistant Examiner*—Peter Chin
*Attorney, Agent, or Firm*—David Bennett; William J. Farrington; James C. Logomasini

[57] ABSTRACT

Cellulosic substrates containing a cationic resinous composition comprising reaction products of (A) adducts of certain dihaloalkanes and alkylene diamine and (B) certain epihalohydrins to increase wet strength.

8 Claims, No Drawings

CELLULOSIC PAPER CONTAINING THE REACTION PRODUCT OF A DIHALOALKANE ALKYLENE DIAMINE ADDUCT AND EPIHALOHYDRIN

This application is a continuation-in-part of U.S. application Ser. No. 506,678, filed Sept. 14, 1974, now abandoned, which is a continuation of U.S. application Ser. No. 318,819, filed Dec. 27, 1972, now abandoned.

BACKGROUND OF THE INVENTION

1. Field of the Invention

This invention relates to cellulosic substrates having improved wet strength and to a method for producing such substrates.

2. Description of the Prior Art

U.S. Pat. 2,834,675, issued May 13, 1958 discloses resinous compositions of dihaloalkanes and alkylene diamine which may be added to paper pulp to improve wet strength.

German Patent No. 955,835, published Jan. 10, 1957, discloses processes for water-proofing paper by adding to the pulp basic products free from reactive halogen or epoxy groups obtained by condensing polyamides with cross-linking compounds such as epichlorohydrin or dichloroethane. Such products also increase the wet strength of paper.

U.S. Pat. No. 2,595,935, issued May 6, 1952, discloses paper products of improved wet strength containing reaction products of alkylene diamine and bifunctional or polyfunctional halohydrins such as epichlorohydrin.

These prior art resinous compositions, although increasing wet strength, have other disadvantages which often makes them commercially unsatisfactory. For example, a resinous composition prepared by the reaction of dichloroethane and a alkylene diamine such as ethylenediamine is unsatisfactory in that it takes a long time to cure, in some instances, up to a year. It also is very inefficient, requiring appreciable amounts to obtain adequate wet strength. Likewise, one produced by reacting epichlorohydrin and a alkylene diamine such as hexamethylenediamine is less efficient.

Canadian Pat. No. 776,566 discloses wet and dry strength improvers obtained by reacting a polyamine having the formula $$NH_2(C_m H_{2m}NH)_p C_mH_m NH_2$$

where m is an integer from 2 to 4 and p is an integer from 1 to 4 with an unbranched dihaloalkane of the formula $X(CH_2)_yX$ wherein X is a halogen and y is 2 or 3, and then reacting the amine prepolymer so formed with an epihalohydrin.

It has however, been found that such products have several grave disadvantages in that the amine prepolymers can only be prepared at low ratios of halogen equivalents to amine equivalents because at higher ratios, the product gels and is useless for further reaction. In addition, the further reaction with epihalohydrin is also restricted by the need to avoid gelation. In practice, this means less efficient use of the expensive amine and epihalohydrin components. Moreover, it is found that they are much inferior, as wet and dry strength resins, to the resins of the present invention.

BRIEF DESCRIPTION OF THE INVENTION

In accordance with this invention, it has been surprisingly found that a cellulosic composition with improved wet strength is provided by treating a cellulosic substrate with a sufficient amount of a cationic resinous composition and curing the resinous composition to its insoluble state after such application. The cationic resinous composition useful in the production of such improved cellulosic compositions comprise the reaction product of (A) an adduct of
 (1) a dihaloalkane represented by the formula $$X-CH_2-(CH_2)_n-CH_2-X \quad \text{Formula I}$$
$$\overset{|}{\underset{}{R}}$$

wherein X represents chloro, bromo or iodo, R represents hydrogen, hydroxy or an alkyl group having 1 to 4 carbon atoms, and n is 0 or 1 and (2) a alkylene diamine represented by the formula $$H_2N\ C_mH_{2m}NH_2 \quad \text{Formula II}$$

wherein m is an integer of from 4 to about 15 in a mole ratio of from about 0.5:1 to about 0.95:1 and (B) an epihalohydrin selected from the group consisting of epichlorohydrin, epibromohydrin and epiiodohydrin, in a mole ratio of from about 1.25 to about 2.5 moles of epihalohydrin per mole of amine group in the adduct.

DETAILED DESCRIPTION OF THE INVENTION

Preferably, the resinous compositions which are applied to cellulosic substrates in accordance with this invention are produced using water as a solvent. For ease and convenience, this reaction is run such that the aqueous solution obtained by reacting the adduct with the epihalohydrin contains about 40% resin solids. Resin solids of the aqueous solution are determined by totaling the weight of the reactants employed, and then dividing by the total weight of the solution including any water added. By controlling the reaction, aqueous solutions can be obtained having any desired viscosity. Generally, they have a viscosity at 40% resin solids on the Gardner-Holdt scale at 25° C. of from A to Z, preferably D to H.

The aqueous solutions may be adjusted to any resin solids concentration to facilitate use when applied to cellulosic substrates. Solutions having a resin solids level of from about 5 to 40%, preferably 20 to 35% and a pH lower than 6° at 25° C. are stable for extended period of time, i.e., over 3 months. A pH of 4.5 to 5.5 is preferred. Generally, the pH is always at least 3, so the solutions can be used in stainless steel equipment. Aqueous solutions having a high concentration of resin solids are preferred to reduce costs, when the solutions must be transported long distances.

Generally, aqueous solutions of the novel resinous compositions in which the epihalohydrin is reacted with the adduct in a molar proportion of epihalohydrin to amino group of the adduct above 2.5:1 are not thermosetting and those below 1.25:1 generally gel. Preferably, the molar proportion is from about 1.5:1 to about 2.25:1.

The adducts of this invention obtained by reacting the dihaloalkane with the alkylene diamine contain essentially linear or branched units with little or no cyclic units. It is preferred that about 85% of the units of the adducts be linear or branched with more than 95% being preferred. They are generally prepared using as a solvent water, water miscible alcohols or mixtures thereof. Aqueous solutions are clear, pale yellow having a pH of from about 8 to 11 at 25° C. Any concentration of the adduct can be used as long as it is suitable for further reaction with the epihalohydrin. A suitable concentration of adduct is from about 25 to 55% by weight, based on the total weight of the solution of adduct. Likewise, the concentration may be adjusted by the addition or removal of solvent to give any desired viscosity. For example, a viscosity of about A to H on the Gardner-Holdt scale at 25° C. is suitable for reacting with epihalohydrin.

Illustrative dihaloalkanes represented by Formula I when n is 0 include 1,2-dichloroethane, 1,2-dibromoethane, 1,2-diiodoethane; and where n is 1 include 1,3-diiodopropane, 1,3-dichloro-2-methyl propane, 1,3-dibromo-2-butyl propane, 1,3-dichloro-2-isobutyl propane, 1,3-dichloro-2-hydroxy-methyl propane, and 1,3-dibromo-2-hydroxy propane. It is preferred that n be 0 and 1,2-dichloroethane is especially preferred.

As mentioned, those dihaloalkanes represented by Formula I when reacted with the proper alkylene diamine of this invention form adducts containing essentially linear or branched units. $\alpha,\omega$-Dihaloalkanes containing 4 to 6 carbon atoms between the halo substituents from piperidine type structures and are not suitable as the major proportions of the adduct in the practice of this invention. However, adducts containing cyclic units may be used to replace a portion of the linear or branched units of the adduct of this invention, i.e., up to about 15 to 20%.

Adducts of this invention possessing substantially the same properties as the adducts prepared using $\alpha,\omega$-dihaloalkanes represented by Formula I, which can be prepared in the same maner and are equivalents thereof are those wherein the $\alpha,\omega$-dihaloalkanes contains over 6 carbon atoms. Such diahaloalkanes include 1,7-dichloroheptane, 1,3-dibromopentane and 1,12-dichlorododecane. Likewise, adducts of this invention possessing substantially the same properties as the adducts prepared using $\alpha,\omega$-dihaloalkanes represented by Formula I, or the equivalent $\alpha,\omega$-dihaloalkanes containing more than 6 carbon atoms, which can be prepared in the same manner and are equivalents thereof are those wherein the $\alpha,\omega$-dihaloalkanes have one, two or more simple substituents, including but not limited to, lower alkyl, e.g., methyl, ethyl, butyl; nitro; sulfate; sulfonyloxy; carboxy; carbo-lower-alkoxy, e.g., carbomethoxy, carbethoxy; amido, hydroxy; lower-alkoxy, e.g., methoxy, ethoxy, and lower-alkanoyloxy, e.g., acetoxy.

Illustrative alkylene diamine represented by Formula II include 1,4-tetramethylenediamine, 1,5-pentamethylenediamine, 1,6-hexamethylenediamine, 1,10-decamethylenediamine, 1,12-dodecamethylenediamine and 1,15-pentadecylmethylenediamine. It is preferred that m be from 4 to 10 and 1,6-hexamethylenediamine is especially preferred.

As mentioned, the adducts of this invention contain essentially linear or branched units. Alkylene diamine represented by Formula II will form these adducts when reacted with the proper dihaloalkane. Adducts containing a major proportion of cyclic units are not suitable in the practice of this invention. However, a minor proportion, i.e., 15 to 20% of the adduct of this invention may be replaced with adducts containing essentially all cyclic units.

Adducts of this invention possessing substantially the same properties as the adducts prepared using alkylene diamine represented by Formula II, which can be prepared in the same manner and are equivalents thereof are those (1) wherein the alkylene diamine contains more than 15 carbon atoms such as 1,19-nonadecyldiamine; (2) wherein the alkylene diamine bears one, two, or more simple substituents including but not limited to lower alkyl, e.g., methyl, ethyl, butyl; nitro; sulfate; sulfonyloxy; carboxy; carbo-lower-alkoxy, e.g., carbomethoxy, carboethoxy; amido; hydroxy; lower-alkoxy, e.g., methoxy, ethoxy and lower-alkanoyloxy, e.g., axcetoxy or (3) wherein the alkylene diamine contain more than 15 carbon atoms and bears one, two or more simple substituents described in (2) above.

Epichlorohydrin, epibromohydrin and epiiodohydrin are the epihalohydrins that may be used in the practice of this invention.

Examples of adducts and resinous reaction products defined by the above formulae are shown in the following tables.

TABLE I

| | Dihaloalkane | ADDUCT Alkylene diamine | Mole Ratio* |
|---|---|---|---|
| A | 1,3-dichloro-2-hydroxy propane | + 1,6-hexamethylenediamine | 0.7 |
| B | 1,3-dichloro-2-ethyl propane | + 1,10-decamethylenediamine | 0.85 |
| C | 1,2-dichloroethane | + 1,6-hexamethylenediamine | 0.90 |
| D | 1,3-dichloro-2-butyl propane | + 1,8-octamethylenediamine | 0.6 |
| E | 1,2-dibromopropane | + 1,14-tetradecamethylenediamine | 0.95 |

*dihaloalkane:alkylene diamine

TABLE II

| | RESINOUS REACTION PRODUCT | | |
|---|---|---|---|
| Sample | Adduct* | Epihalohydrin | Mole Ratio** |
| 1 | A | + epichlorohydrin | 1.25:1 |
| 2 | B | + epiiodohydrin | 1.5:1 |
| 3 | C | + epichlorohydrin | 1.75:1 |
| 4 | D | + epibromohydrin | 1.25:1 |
| 5 | E | + epichlorohydrin | 2.25:1 |

*From Table I
**Moles of epihalohydrin per mole of amine group in said alkylene diamine The dihaloalkanes defined by Formula I are reacted with alkylene diamine defined by Formula II with constant stirring over a prolonged period, care being taken to control addition of the dihaloalkane to the diamine such that the exothermic reaction does not cause a substantial rise in the reaction temperature.

For example, the dihaloalkanes are reacted with the alkylene diamine in the aforementioned ratios at a temperature range of from about 25° C. to reflux or above preferably from about 60° C. to 90° C. in a solvent such as water, water miscible alcohols or mixtures thereof. Water is preferred. Any suitable solids content of the reactants in the reaction mixture may be employed. It is most advantageous that initially they be high, 60 to 90% by weight, based on the total weight of the reaction mixture.

As the reaction proceeds, the viscosity increases, it is conveniently kept from G to S on the Gardner-Holdt scale by the addition of solvent. Viscosity is measured at 25° C. In order to maintain a reasonable reaction rate any strong base or other acid acceptor may be added to neutralize any HCl formed. These bases include alkali metal hydroxides or alkali metal alkoxides.

The reaction is carried out until there are substantially no free dihaloalkanes present in the reaction mixture.

The adduct may be reacted with epihalohydrin according to the procedure described in U.S. Pat. No. 2,595,935 which is incorporated herein by reference.

For example, epihalohydrin is added to the adduct in the presence of a solvent such as water, water miscible alcohols or mixtures thereof at a temperature range of from about 25° to 45° C. preferably from about 25° to 35° C. over a period of 10 minures to 120 minutes preferably 30 minutes to 90 minutes. The solids concentration of the reactants in the reaction mixture during the reaction is from about 20% to about 60%, by weight, preferably from about 30% to about 40%, based on the total weight of the reaction mixture. After addition is complete, the temperature is raised by the addition of heat to about 60° to about 80° C. Reaction is continued at this temperature range by the addition of more heat until the resinous reaction product reaches a viscosity at 40% resin solids measured at 25° C. on the Gardner-Holdt scale within the order of A to about Z preferably from about D to about H. The pH is reduced by the addition of a suitable acidic substance, well known to those skilled in the art such as $H_2SO_4$, HCl, etc.

As stated above, the resinous reaction products of this invention are particularly valuable as wet strength improvers for cellulosic substrates, particularly paper. Paper, in accordance with this invention, includes all materials which are encompassed within the ordinary and usual meaning of the word. Generally speaking, paper includes cellulosic and other vegetable fibers formed into thin felts or nonwoven sheets.

Aqueous solutions of the resinous compositions are particularly valuable in increasing the wet strength of paper. Generally, they contain 5 to 40% of uncured resin solids, preferably 20 to 35%; and 60 to 95%, preferably 65 to 80% by weight of water, based on the total weight of the aqueous solution. Any concentration of the uncured resin solids may be used to increase the wet strength of paper except as limited by handling conditions. Likewise, they can be used at any viscosity except as limited by handling conditions.

When the resinous compositions are applied to cellulosic paper products of various types, conventional techniques known to those skilled in the art may be used. Thus, for example, preformed and partially or completely dried paper may be impregnated by immersion in, or spraying with, an aqueous solution of the resin following which the paper may be heated for about 0.5 to 30 minutes at temperatures of 90° C., to 100° C. or higher to dry same and cure the resin to a water insoluble condition. The resulting paper has increased wet strength, and, therefore, this method is well suited for the impregnation of paper towels, absorbent tissue and the like to impart wet strength characteristics thereto.

The preferred method of incorporating these resins in paper, however, is by internal addition prior to sheet formation whereby advantage is taken of the substantivity of the resins for hydrated cellulosic fibers. In practicing this method an aqueous solution of the resin in its uncured and hydrophilic state is added to an aqueous suspension of paper stock in the beater, stock chest, Jordan engine, fan pump, head box or at any other suitable point ahead of sheet formation. The sheet is then formed and dried in the usual manner, thereby curing the resin to its polymerized and water insoluble condition and imparting wet strength to the paper.

The cationic thermosetting resins herein disclosed impart wet strength to paper when present therein in amounts of about 0.1-5% or more based on the dry weight of the paper. The quantity of resin to be added to the aqueous stock suspension will depend on the degree of wet strength desired in the finished product and on the amount of resin retained by the paper fibers.

The uncured cationic thermosetting resin incorporated in paper in any suitable manner, as described above, may be cured under acid, neutral or alkaline conditions, i.e., at pH's from about 3.0 to 13 by subjecting the paper to a heat-treatment for about 0.5 to 30 minutes at a temperature from about 90° to 100° C. Optimum results, however, are obtained under alkaline conditions. For example, in those applications where short cure times are required, for example, fine papers such as sanitary tissues, the resinous compositions may be made alkaline (pH 8–13) prior to use. Such a pretreatment results in shorter cure times and increased wet strength. Any strong base may be used such as alkali metal hydroxides or alkoxides. Sodium hydroxide is preferred.

The following Examples illustrate the invention.

EXAMPLE I

Fifty-eight grams (0.5 mole) of 1,6-hexamethylenediamine is placed in a 4-necked flask equipped with a thermometer, mechanical stirrer, condenser and an additional funnel. To this is added 10.2 grams of water and the mixture heated externally to 70° C. Forty-two grams (0.43 mole) of 1,2-dichloroethane is added at a rate slow enough to keep the reaction temperature below 75° C., ~3 hours addition time. Water, 8 grams at a time, is added during this 3 hour period to keep the reaction viscosity below Gardner S. When the addition of 1,2-dichloroethane is complete, add 8 grams of 50% aqueous sodium hydroxide. Maintain the reaction at 70° C. until the viscosity reaches Gardner V. At this point, add 8 grams of water and raise the temperature to 80° C. Maintain 80° C. until the viscosity reaches Gardner T. Add 315 grams of water and cool the mixture to 25° C. To this mixture, over a 1 hour period, add 184.8 grams (2 moles) of epihalohydrin allowing the reaction temperature to raise to 45° C. After an additional hour at 45° C., raise the reaction temperature to 65° C. and maintain until the viscosity of the solution reaches Gardner D. At this viscosity, add 9 grams of 98% by weight sulfuric acid and 227 grams of water. Adjust the final pH to ~5 and the final solids to 25% with additional sulfuric acid and water.

An actual experimental run of the above procedure yielded 1200 grams of a solution containing 25% solids and having a pH of 4.5 at 25° C.

EXAMPLE II

Following the procedure of Example I, the adducts and resinous reaction products set out in Tables III and IV are prepared by substituting for 1,2-dichloroethane, 0.43 mole of 1,2-dibromoethane, 0.43 mole of 1,2-diiodoethane, 0.43 moles of 1,3-dichloro-2-methyl propane, 0.43 mole of 1,3-diiodo-2-butyl propane or 0.43 mole of 1,3-dichloro-2-isobutyl propane; or for epichlorohydrin 2 moles of epiiodohydrin, or 2 moles of epibromohydrin; or for 0.5 mole of 1,5-hexamethylenediamine 0.5 mole of 1,5-pentamethylenediamine, 0.5 moles of 1,7-heptamethylenediamine or 0.5 moles of 1,12-dodecamethylenediamine.

TABLE III

| | ADDUCT | | |
|---|---|---|---|
| | Dihaloalkane | Alkylene diamine | Mole Ratio* |
| A | 1,2-dibromoalkane | + 1,6-hexamethylenediamine | 0.86:1 |
| B | 1,2-diiodoalkane | + 1,6-hexamethylenediamine | 0.86:1 |
| C | 1,3-dichloro-2-methylpropane | + 1,6-hexamethylenediamine | 0.86:1 |
| D | 1,3-diiodo-2-butylpropane | + 1,6-hexamethylenediamine | 0.86:1 |
| E | 1,3-dichloro-2-isobutylpropane | + 1,6-hexamethylenediamine | 0.86:1 |
| F | 1,2-dichloroalkane | + 1,3-pentamethylenediamine | 0.86:1 |
| G | 1,2-dichloroalkane | + 1,7-heptamethylenediamine | 0.86:1 |
| H | 1,2-dichloroalkane | + 1,12-didecamethylenediamine | 0.86:1 |

*Dihaloalkane: alkylene diamine

TABLE IV

| | RESINOUS REACTION PRODUCT | | |
|---|---|---|---|
| | Adduct* | Epihalohydrin | Mole Ratio** |
| 1 | A | + epibromohydrin | 2:1 |
| 2 | B | + epiiodohydrin | 2:1 |
| 3 | C | + epichlorohydrin | 2:1 |
| 4 | D | + epichlorohydrin | 2:1 |
| 5 | E | + epichlorohydrin | 2:1 |
| 6 | F | + epichlorohydrin | 2:1 |
| 7 | G. | + epibromohydrin | 2:1 |
| 8 | H | + epibromohydrin | 2:1 |

*from Table III
**Moles of epihalohydrin per mole of amine group of the adduct

EXAMPLE III

Following the procedure of Example 1, the adducts and resinous reaction products set out in Tables III and IV are prepared but at different mole ratios. They are described in Tables V and VI.

TABLE V

| | ADDUCT | |
|---|---|---|
| | Adduct | Mole Ratio |
| 1 | A | 0.7:1 |
| 2 | A | 0.8:1 |
| 3 | A | 0.9:1 |
| 4 | B | 0.6:1 |
| 5 | B | 0.5:1 |
| 6 | B | 0.94:1 |
| 7 | C | 0.85:1 |
| 8 | D | 0.6:1 |
| 9 | E | 0.65:1 |
| 10 | F | 0.55:1 |
| 11 | F | 0.78:1 |
| 12 | G | 0.9:1 |
| 13 | H | 0.89:1 |

TABLE VI

| | RESINOUS REACTION PRODUCTS | | |
|---|---|---|---|
| | Adduct of Table V | Epihalohydrin | Mole Ratio* |
| 1 | A | epibromohydrin | 2.25:1 |
| 2 | A | epibromohydrin | 1.25:1 |
| 3 | A | epibromohydrin | 1.6:1 |
| 4 | B | epiiodohydrin | 2.45:1 |
| 5 | B | epiiodohydrin | 1.45:1 |
| 6 | B | epiiodohydrin | 1.9:1 |
| 7 | C | epichlorohydrin | 1.85:1 |
| 8 | D | epichlorohydrin | 2:1 |
| 9 | E | epichlorohydrin | 2.0:1 |
| 10 | F | epichlorohydrin | 2.25:1 |
| 11 | F | epichlorohydrin | 1.9:1 |
| 12 | G | epibromohydrin | 1.8:1 |

TABLE VI-continued

| | RESINOUS REACTION PRODUCTS | | |
|---|---|---|---|
| | Adduct of Table V | Epihalohydrin | Mole Ratio* |
| 13 | H | epibromohydrin | 1.45:1 |

*Mole of epihalohydrin per mole of amine group of the adduct.

EXAMPLE IV

To an aqueous pulp slurry of 0.5% consistency and pH of 8.0 composed of unbleached softwood kraft fibers beaten to a Canadian standard freeness of 455 ml is added the appropriate amount of the thermosetting resin of Example I. The pulp slurry is readjusted to pH 8 with 1% sodium hydroxide and stirred briefly to allow the resin to distribute on the pulp. The fibers are formed into a wet-laid web having a consistency of 34% on a Noble and Wood lab handsheet machine. The wet sheets are pressed on a material felt and dried for 2 minutes on a lab down drier at 204° F. The resulting 2.5 g. 8" × 8" handsheet is cut into 1" × 8" strips. The strips are oven cured for 10 minutes at 105° C. The cured strips are soaked in water for 10 minutes and tested for wet strength.

An actual run of the above procedure gave the results set out in Table VII.

TABLE VII

| Sample | Resin Level % | Wet Tensile lb./inch* |
|---|---|---|
| 1 | 0 | 0.6 |
| 2 | 0.25 | 3.17 |
| 3 | 0.50 | 5.20 |
| 4 | 0.75 | 5.91 |

*measured using Instron Tensile Tester

EXAMPLE V

Following the procedure of Example IV, the resinous reaction products set out in Table IV are used in place of the thermosetting resin of Example I.

EXAMPLE VI

Following the procedure of Example IV, the resinous reaction products set out in Table VI are substituted for the thermosetting resins of Example I.

The following Examples are included to demonstrate that the wet strength resins of the present invention are quite different and superior to those exemplified by the disclosures in Canadian Pat. No. 776,566.

The Canadian patent describes resins formed by the reaction of a prepolymer formed from a dihaloalkane and a alkylene diamine poly-alkylene polyamine of the formula $NH_2(C_mH_{2m}NH)_pC_mH_{2m}NH_2$ where p is 1 to 4 and m is 2 to 4, and an epihalohydrin.

It has surprisingly been found that such resins are markedly inferior to resins prepared using as the original amine a simple α, ω-diamine. Moreover, this superiority is shown whether the resins are compared on a weight for weight basis or on the basis of the ratio of epihalohydrin to amine equivalents (E/A) in the reaction.

The Examples illustrating this discovery are in two groups.

The first group of Examples, VII, VIII and IX, illustrate the comparative processes for the production of the amine prepolymer. Example VII is a reproduction of the Example in the Canadian patent and covers both possible interpretations of the instructions, (i.e. staged addition of the dihaloalkane or "all-at-once"). Example VIII duplicates Example VII with the difference that an equal weight of hexamethylene diamine is substituted for the iminobispropylamine (IBPA). Example IX compares the production of the amine prepolymers of Examples VII and VIII using as nearly as possible the same ratio of amine equivalent to halide equivalent, as opposed the same weights of reactants.

The second group illustrates the production of wet strength resins using the prepolymer prepared according to the processes described in the first group. Example X shows the production of a wet strength resin according to the invention and Example XI describes the preparation of a resin with a similar E/A ratio but with the difference that the prepolymer was based on IBPA. Table VIII compares the wet strengths of paper treated with the two resins. Example XII describes the production of a resin using the same weight of prepolymer as was used in Example X with the difference that the prepolymer was based on IBPA. Table IX compares the performance of the Example X and XII resins. Example XIII describes the production of resins using as the initial amine 1,3-propane diamine. These resins are comparable with those of Example X on a weight/weight basis and Table X sets forth a comparison of the performance of the two resins.

EXAMPLE VII

This Example describes the production of an amine prepolymer using 3,3'-iminobispropylamine (IBPA) as the initial amine reactant. In both methods described the >CHCl/>NH equivalent ratio is 0.589.

Method A

A one liter, four-necked flask equipped with stirrer, thermometer, addition funnel and condenser was charged with 198 grams (1.509 moles and 4.527 amine equivalents) of IBPA and 90 grams of deionized water. The flask was heated to 72° ± 2° C. and the slow dropwise addition of dichloroethane (132 grams, i.e., 1.333 moles and 2.667 equivalents of >CHCl) was initiated. The addition was accompanied by stirring and was completed in 2 hours.

The temperature of the reaction mixture was gradually raised to 80° C. for a further four hours. The mixture was diluted by addition of a further 240 g. of deionized water.

The Gardner viscosity of the product was V and the solids content (theoretical 50%) was found to be 45.7%. The amine equivalents were found to be 2.83 meq./g.

Method B

A 500 ml flask equipped as is described in Method A was charged with 99.0 grams of IBPA (0.745 mole) and 45.0 grams of deionized water. The flask was then cooled to about 2° C. and 66.0 grams (0.667 mole and 1.333 equivalents of >CHCl) of dichloroethane were added, with stirring over a very short span.

The temperature began to rise rapidly but cooling was applied to keep the temperature below about 75° C. After a reaction time of 2 hours 50 minutes the resin product was cooled and the reaction terminated. 120G. of deionized water were then added.

The Gardner viscosity of the mixture was D+/E− and the total solids (theoretical 50%) were found to be 45.86%. The product was found to contain 3.278 meq/g.

EXAMPLE VIII

This Example describes the production of an amine prepolymer using a diamine. These methods duplicate the methods described in Example VII using a similar dichloroethane/amine weight ratio but substituting hexamethylene diamine for IBPA.

Method A

The apparatus and process steps were as described in Example VII (Method A), except that the reactants charged were 130.8 g. (0.852 mole) of 75.7% assay hexamethylene diamine (HMD), 13.2 g. of deionized water and 66 g. of dichloroethane (0.667 mole, 1.333 equivalent of >CHCl) were added dropwise over a period of three hours.

The temperature of the reaction mixture, after completion of the addition of the dichloroethane, was raised to 80° C. over a period of 1.5 hours and maintained at that temperature for 4 hours. The solution was then cooled, diluted to a theoretical 50% solids by addition of 120 g. of deionized water.

The Gardner viscosity was found to be B+ and the solids content was 48.13%. The amine content was determined via titration to be 1.252 meq./g.

Method B

This method duplicates that of Example VII, Method B, except that HMD is substituted for IBPA.

The reactants charged were 130.8 g (0.852 mole) of 75.7% assay HMD and 13.2 g. deionized water and 66.0 g. (0.667 mole and 1.333 equivalents of >CHCl) were added at once with stirring. After the reaction the solution was diluted to a theoretical 50% solids by addition of 120 g. of deionized water.

The Gardner viscosity was found to be A-½ and the actual total solids was 46.63%. The total amine content was determined to be 1.688 meq./g.

It should be noted that in the methods described in Example VIII the viscosity of the 50% solids solution is substantially lower than the viscosity of the corresponding products described in Example VII.

EXAMPLE IX

Examples VII and VIII were run at the same weight ratio of amine to dichloroethane and it was clearly shown that the Gardner viscosity of the product obtained using HMD was lower than that obtained using IBPA, both being at the same total solids level.

However, to be complete the comparison should be made at the same equivalent ratio of chloride to amine groups. In the following Methods A and B an attempt was made to make such a comparison.

Method A

A half-liter 4-necked flask equipped with condenser, stirrer, thermometer and addition funnel was charged with 77.2 g. (0.50 mole, 1.0 amine equivalent) of 75.7% assay HMD (18.76 % water).

Dichloroethane (42.6 g., i.e. 0.43 mole, 0.86 >CHCl equivalent) was added dropwise over three hours while the temperature was maintained at 72–73° C. after which the mixture was stirred for a further 45 minutes at 73°–75° C. Thereafter, 8.0 g. of water and 8.0 g. of 50% sodium hydroxide were added and the temperature was raised to 80° C. After a further hour and again after two hours, 8.0 g. of water were added. Two and a half hours after the last water addition the reaction terminated.

The mixture had a theoretical 50% total solids (formed 47.8%) and a Gardner viscosity of C/C+. The theoretical amine equivalent of the prepolymer was 1.161 meq/g. and the determined value was 1.374 meq/g.

Method B

This is an attempt to duplicate Method A using IBPA in place of HMD using the same apparatus and reaction conditions.

The reaction vessel was charged with 58.4 g. (0.445 mole, 1.336 amine equivalent) of IBPA and 18.8 g. of deionized water. Dropwise addition of 42.6 g (0.43 mole, 0.86 >CHCl equivalent) of dichloroethane took place over a period of 3 hours. It was necessary to add 8.0 g. of water after 2 hours and on completion of the addition 8.0 g. of 50% sodium hydroxide were added. After a further hour a further 8.0 g. of water were added and the temperature was raised to 80° C. Fifteen minutes later 8.0 g. of water were added and a further 8.0 g. of water fifty-five minutes later. An hour later the reaction mixture had gelled and the reaction was discontinued.

It should be noted that using an even higher >CHCl/>NH equivalent ratio, 0.783, HMD gave an amine-prepolymer with a Gardner viscosity of C/C+ whereas the IBPA prepolymer gelled at an equivalent ratio of 0.644. However, the reaction mixture did not gel when the same ratio was only 0.589, (Example VII, Method A), though the Gardner viscosity did reach V.

It is apparent therefore that using a diamine it is possible to reach a higher >CHCl/>NH ratio than is possible using an iminobis-amine such as IBPA. This in turn means that the amine is used more efficiently in producing the amine prepolymer.

EXAMPLE X

This Example illustrates the production of a wet strength resin using the prepolymer of Example VIII (Method A).

A reaction vessel fitted with condenser, thermometer, stirrer and dropping funnel was charged with 38.75 g. of the amine prepolymer prepared in Example VIII, (Method A), and 31.46 g. of epichlorohydrin (0.340 mole, epichlorohydrin/amine ratio — E/A = 1.70) were added dropwise with stirring over an hour. The temperature rose during the reaction from an initial 25° C. to 60° C. after 3 hours and was held at this temperature for a further 1½ hours. After 3½ hours and again after 4 hours 1.6 g. of 50% aqueous sodium hydroxide were added. After 4½ hours total reaction time the reaction was killed by addition of 30 g. of deionized water and 2.2 g of 96% sulphuric acid.

The total solids — the reaction mixture was found to be 26.86% (32.2% is theoretical) and the Gardner viscosity of this mixture was E. The product yield was 83.4% of theoretical.

EXAMPLE XI

This Example is a re-run of Example X using as the amine prepolymer the product of Example VII (Method A).

The same apparatus as was used in Example X was charged with 36.45 g. of the amine prepolymer product of Example VII (Method A). To this prepolymer were added 39.33 g. (0.425 mole) of epichlorohydrin, giving the same E/A ratio of 1.70.

After 2 hours, 40 minutes the reaction was nearing gelation and was killed by addition of 30.0 g. of deionized water and 3.0 g. of 96% sulphuric acid.

The Gardner viscosity, at 25.48% solids. (theoretical is 34.35%) was E+/F− and the yield was 74.2% of theoretical.

The resin produced according to this Example was compared in terms of its wet strength with the resin produced according to Example X.

The wet strength was measured by the method described in Example IV except that the pulp was a 50:50 bleached hardwood/softwood Kraft blend with a Canadian Standard Freeness of 452, the pH of the slurry was 7 and the web consistency was 36.1%. The samples were divided into two lots: those for uncured and those for cured wet strength testing. The latter were cured at 90° C. for 15 minutes. Before testing in an Inston Tensile Tester each sample was soaked in deionized water for 10 minutes. The results are set forth in Table VIII.

TABLE VIII

| | | Wet Strength (lbs/in) | |
|---|---|---|---|
| Resin of: | Application Level lbs/ton | Uncured (Average of 4) | Cured (Average of 4) |
| Example X | 5 | 1.95 | 3.10 |
| (Invention) | .10 | 2.85 | 4.53 |
| | 15 | 3.62 | 5.56 |
| Example XI | 5 | 1.45 | 2.23 |
| (Comparative) | 10 | 2.00 | 3.06 |
| | 15 | 2.52 | 3.55 |

It will be observed that the wet strength of papers treated with the resins of the invention are very much better than those prepared by the process of this Example XI. This factor plus the greater yield obtained in the process of Example X by comparison with Example XI and the better controllability of the viscosity changes make the resin of Example X much superior to that of Example XI. This effect is the more surprising in that the same E/A ratio was used to prepare each resin.

EXAMPLE XII

As indicated above the resins produced in Examples X and XI were compared on the basis of their identical E/A ratio. However, they necessarily used different weights of the amine prepolymer. This Example describes the production of a wet strength resin that is produced using the amine prepolymer of Example VII (Method A) in a weight ratio to epichlorohydrin that is substantially the same as was used in Example X. The major difference between this reaction and that described in Example X is that this is run at 30% total solids instead of 50% total solids. This change was essential because an attempt to run at the higher figure resulted in a gelled-up reaction.

The apparatus used in Example X was charged with 40.8 g. (0.28 potential amine equivalents) and 94.79 g. of deionized water. Epichlorohydrin (31.46 g. i.e., 0.34 mole) was added gradually over a period of an hour during which time the temperature was allowed to rise to 45° C. One hour and 30 minutes after addition was complete, the temperature was raised to 60° C.

Ten minutes later 2.24 g. of 50% sodium hydroxide were added and after a further twenty minutes, with the viscosity rising rapidly, the reaction was killed by addition of 4.0 g. of 96% sulphuric acid.

The product had a Gardner viscosity of F+ at a total solids of 26.6% (31.9% theoretical) and the yield was 83.4% of theoretical. The amount of dichloropropanol by-product was 7.4% of the product weight. Table IX below gives a comparison of the wet strength performance of the resins prepared in Example X and this Example. Wet strengths are measured in the manner indicated in the description of Example XI.

basic reaction procedures and the weights of reactants used.

The final product had a Gardner viscosity of F−/F at a solids content of 29.74% (theoretical 28.67%). The yield was 103.7% of theoretical and the amount of dichloropropanol by product in the final reaction mixture was 1.80%.

A repeat of the above resin preparation run at 50% solids yielded a resin with a Gardner viscosity of C at 27.65% total solids (theoretical is 28.48%). The yield was 97.1% and the amount of dichloropropanol by product formed was 3.14% of the reaction mixture weight.

A comparison of the above data with that obtained in Example XII is given in Table X below. All wet strength measurements were made in the manner described above in the description of Table VIII.

TABLE X

| Resin | Application Level lbs/ton | Wet Strength(lbs/in.) (Average of 4) Uncured | Cured | Yield | Residual Dichloropropanol |
|---|---|---|---|---|---|
| Example XII | 5 | 1.39 | 2.28 | | |
| (Comparative) | 10 | 2.10 | 3.34 | 83.4% | 7.4% |
| (30% T.S.run) | 15 | 2.46 | 4.05 | | |
| Example XIII | 5 | 1.53 | 2.79 | | |
| (30% T.S.run) | 10 | 2.42 | 3.81 | 103.7% | 1.80% |
| | 15 | 3.11 | 4.70 | | |
| Example XIII | 5 | 1.53 | 2.72 | | |
| (50% T.S.run) | 10 | 2.30 | 3.46 | 97.1% | 3.14% |
| | 15 | 2.95 | 4.32 | | |

TABLE IX

| Resin of: | Application Level (lbs./ton) | Wet Strength (lbs/in) (Average of 4) Uncured | Cured |
|---|---|---|---|
| Example X | 5 | 1.95 | 3.10 |
| (Invention) | 10 | 2.85 | 4.53 |
| | 15 | 3.62 | 5.56 |
| Example XII | 5 | 1.39 | 2.28 |
| (Comparative) | 10 | 2.10 | 3.34 |
| | 15 | 2.46 | 4.05 |

From the above Table and from Table VIII it can be seen that whether compared on an E/A basis or a weight basis, wet strength resins prepared using an amine prepolymer made by the reaction of a dihaloalkane with an amine prepolymer made by the reaction of a dihaloalkane with an α,ω-diamine such as HMD perform at a much more efficient level than do similar resins made using an imino-bis-amine such as IBPA.

EXAMPLE XIII

The comparisons described above were made between the resins made as representative, diamine and imino-bis-amine, HMD and IBPA, respectively. This Example describes the production of a resin according to the invention made using 1,3-propane diamine (PD) and compares the product with that of Example XII.

An amine prepolymer was prepared in the manner described in Example VII Method A with the difference that the amine was 167.78 g. (2.263 mole, 4.527 amine equivalents) of 1,3-propane-diamine. The equivalent ratio of >CHCl to >NH was 0.589.

The Gardner viscosity was A at 45.86% total solids (theoretical was 50%). The prepolymer contained 3.157 meq/g. of amine which agreed closely with the theoretical figure of 3.102 meq/g.

This prepolymer was reacted with epichlorohydrin in the manner described in Example XII in terms of the From Table X it can be seen that a wet strength resin prepared from an amine prepolymer formed by the reaction of PD and dichloroethane is substantially more effective than are prepared in an identical fashion except for the substitution of IBPA.

Moreover, the advantages lie not only in the wet strength performance but also in the efficiency of the reaction by which they are produced as evidenced by the yield and the amount of dichloropropanol by product.

The above Examples are intended to demonstrate the invention only and are not to be understood as implying any limitations thereto. It is foreseen that a number of amendments and variations could be made to the basic invention without departing therefrom. It is intended that all such minor amendments and variations shall be within the purview of this invention.

What is claimed is:

1. A cellulosic paper having improved wet strength which comprises a cellulosic paper and a sufficient amount of thermosetting cationic resinous composition to impart wet strength, said resinous composition comprising the reaction product of (A) an adduct of
  (1) a dihaloalkane represented by the formula

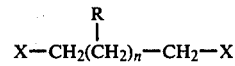

wherein X represents chloro, bromo, or iodo, R is hydrogen, hydroxy or alkyl group having 1 to 4 carbon atoms, and n is 0 or 1, and (2) alkylene diamine represented by the formula

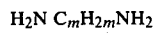

wherein m is an integer of from 4 to about 15 in a mole ratio of from about 0.5:1 to about 0.95:1 and (B) an epihalohydrin selected from the group consisting of epichlorohydrin, epibromohydrin, and epiiodohydrin, in a mole ratio of from about 1.25 to about 2.5 moles of epihalohydrin per mole of amine group in said adduct, and said resinous composition having been cured to a water insoluble state after application to said cellulosic paper.

2. A cellulosic paper according to claim 1 wherein X is chloro and n is 0.

3. The cellulosic paper according to claim 1 wherein m is 4 to 10.

4. A cellulosic paper according to claim 1 wherein the mole ratio of epihalohydrin to the amine of said adduct is from about 1.5 to about 2.25 moles of epihalohydrin per mole of amine group in said adduct.

5. A cellulosic paper according to claim 1 wherein m is 6.

6. A cellulosic paper according to claim 1 wherein said thermosetting cationic resinous composition is added to the pulp prior to the formation of the paper web.

7. A cellulosic paper having improved wet strength which comprises a cellulosic paper and a sufficient amount of thermosetting cationic resinous composition to impart wet strength, said resinous composition comprising the reaction product of an adduct of dichloroethane with hexamethylene diamine in a mole ratio of from 0.5:1 to about 0.95:1 and epichlorohydrin in a mole ratio of from about 1.5 to about 2.25 moles of epichlorohydrin per mole of amine group in the adduct, the said resinous product having been cured to a water-insoluble state after application to said paper.

8. A method for producing the cellulosic paper of claim 1 which comprises applying said resinous composition to said cellulosic paper and thereafter curing said resinous composition to its insoluble state.

* * * * *